United States Patent

[11] 3,603,421

| | | |
|---|---|---|
| [72] | Inventors | Teruo Maeda;<br>Susumu Miyata, both of Yokohama, Japan |
| [21] | Appl. No. | 779,929 |
| [22] | Filed | Nov. 29, 1968 |
| [45] | Patented | Sept. 7, 1971 |
| [73] | Assignee | Nissan Jidosha Kabushiki Kaisha<br>Yokohama, Japan |
| [32] | Priority | Dec. 4, 1967 |
| [33] | | Japan |
| [31] | | 42/77,565 |

[54] INDEPENDENT SUSPENSION DEVICE FOR SUSPENDING AUTOMOBILE WHEELS
1 Claim, 9 Drawing Figs.

[52] U.S. Cl. ................................................. 180/73 R
[51] Int. Cl. ................................................. B60g 3/14
[50] Field of Search ........................................ 180/73, 73
D; 280/124.1, 124

[56] References Cited
UNITED STATES PATENTS

| | | | |
|---|---|---|---|
| 2,911,052 | 11/1959 | Olley | 180/73 (D) |
| 3,439,767 | 4/1969 | Lynes et al. | 180/73 |

*Primary Examiner*—A. Harry Levy
*Attorney*—Sughrue, Rothwell, Mion, Zinn and Macpeak ABSTRACT: An independent suspension device for suspending each wheel of an automobile, having a suspension arm means for axially supporting each wheel. The suspension arm means is pivotally carried by a suspension member in such manner that the axis of rotation of the suspension arm means is horizontally slanted relative to the longitudinal axis of the automobile by a first angle, and the axis of rotation of the suspension arm is also vertically inclined with respect to a horizontal plane by a second angle. The first angle is so related with the second angle that the camber thrust force generated in the automobile body by the motion of the wheel relative to the automobile body is always cancelled by the cornering force generated by said motion of said wheel, regardless of the magnitude of the bouncing motion of the wheel. Whereby, the straight maneuverability and the ride of the automobile are greatly improved.

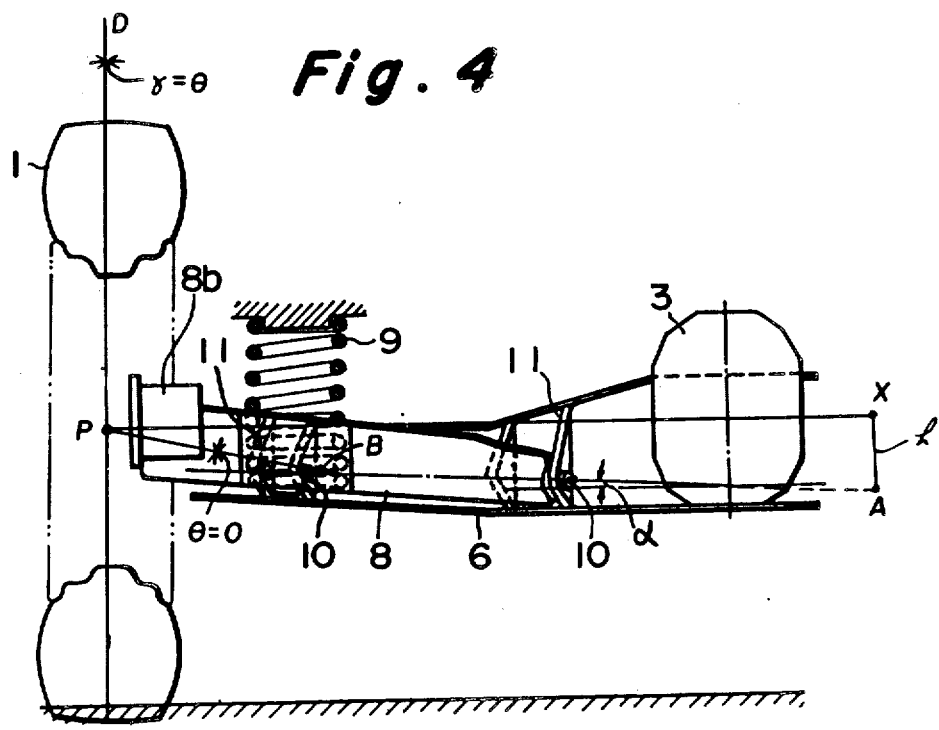

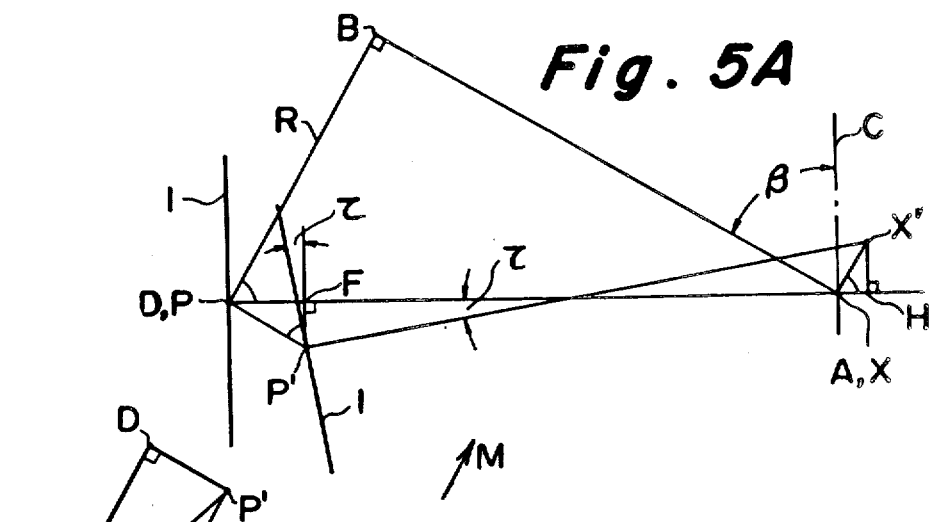
Fig. 5A
Fig. 5B
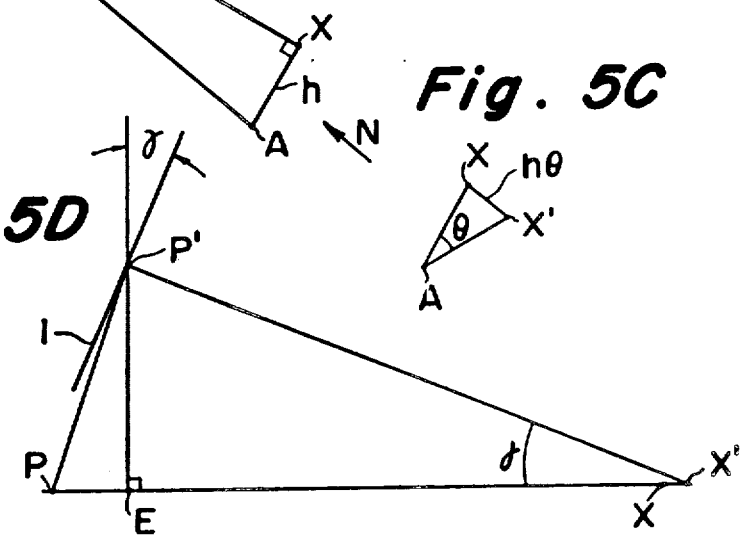
Fig. 5C
Fig. 5D

INDEPENDENT SUSPENSION DEVICE FOR SUSPENDING AUTOMOBILE WHEELS

This invention relates to an independent suspension arrangement for automobile wheels, and more specifically to a suspension arrangement having the suspension member connected to a body of the automobile, and suspension arm means supported by the suspension member at one end thereof so as to be swingable around an axis of rotation thereof, a bearing means integrally secured with said suspension arm means for rotatably supporting a shaft carrying a wheel, and shock absorbing means inserted between said suspension arm means and said automobile body, wherein the swinging movement of the suspension arm means causes a variation of both camber and toe angles.

In known independent suspensions of semitrailing type and swing axle type, when a wheel is raised above a predetermined normal level, due to the unevenness of road surface, the wheel cambers, or swings its upper end toward the automobile body, by a camber angle $\gamma$, and a lateral camber thrust $F_1$ is produced by the camber angle. Such lateral force $F_1$ causes rough ride and impedes the straight driving or straight maneuverability.

If the wheel is so disposed as to swing around its vertical diameter, together with its cambering, in response to its vertical movement relative to the automobile body, and if said swing around the vertical diameter is such that a cornering force $F_2$ having the same magnitude as that of the camber thrust force $F_1$ is generated in a direction opposing said camber thrust, the aforesaid impediment against straight maneuverability and rough ride of automobiles on rough roads can be substantially eliminated, and accordingly, the straight maneuverability and the ride of the automobile can be greatly improved.

Therefore, an object of the present invention is to obviate the aforesaid difficulty of known independent suspensions, by providing a novel independent suspension device of semitrailing arm type or swing axle type, which has a suspension arm means pivotally supported by an automobile body, the suspension arm means having its axis of rotation horizontally slanted from the longitudinal axis of the automobile body and vertically inclined with respect to a horizontal plane, so that upon vertical movement of each wheel suspended by said suspension arm means, a toe angle is produced lateral to the automobile body in conjunction with a camber angle relative to a vertical, whereby a camber thrust due to the camber angle can be fully compensated by a cornering force due to the steering angle.

According to the present invention, there is provided the above-mentioned independent suspension arrangement, characterized in that the axis of rotation of the suspension arm means is slanted horizontally relative to the longitudinal axis of the automobile body by a first angle $\beta$ and inclined vertically by a second angle $\alpha$ with respect to a horizontal plane, said first and second angles satisfying the relation of $$\cos\alpha\cos\beta/\sin\alpha = N/C,$$

wherein $N$ is a cornering force per unit degree of camber angle generated in said body by angular displacement of said wheel in the horizontal plane relative to the body, $C$ is a camber thrust force per unit degree of toe angle generated in the body by angular displacement of the wheel in a vertical plane relative to the body and directed against the cornering force.

For a better understanding of the invention, reference is made to the accompanying drawings, in which:

FIG. 4 is an elevation of the device of FIG. 3;

Figure 6:
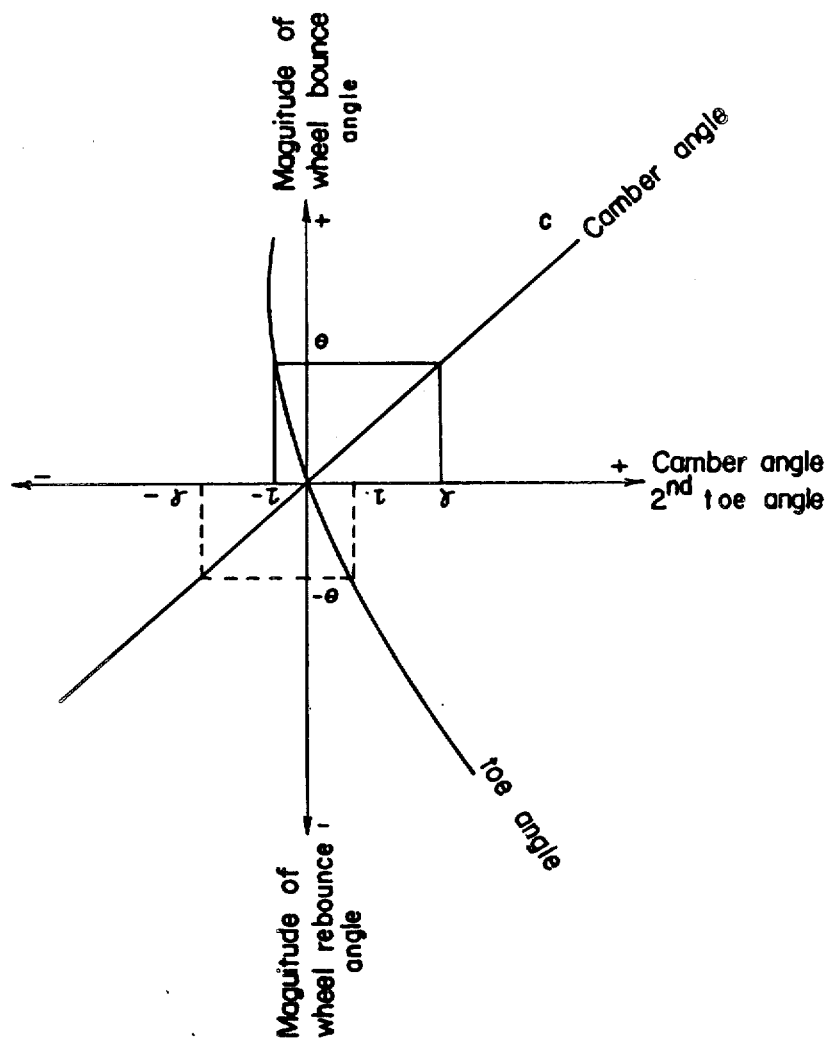

FIGS. 5-A to 5-D are schematic diagrams useful for the analysis of the independent suspension device of semitrailing type, according to the present invention; and FIG. 6 is a graph, showing the relation among the magnitude of bounce of a wheel suspended by the device of the present invention and camber angles and steering (toe) angles.

Like parts and members are designated by like numerals and symbols throughout the drawings.

Figure 1:
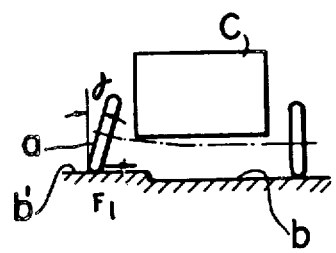
FIGS. 1 and 2 are a schematic plan view and a schematic rear view, respectively, illustrating the operative principles of an independent suspension device according to the present invention.

Referring to FIG. 1, with an independent suspension device of semitrailing type or swing axle type, when a wheel $a$ at one side of an automobile encounters a bump $b'$ in the road $b$, the particular wheel is raised relative to the automobile body $C$, substantially without affecting the height of the body $C$ above the road $b$. As a result, the wheel is tilted from a vertical by a camber angle $\gamma$, and a camber thrust $F_1$ is generated at right angle with the driving direction of the automobile. Such camber thrust impedes the straight maneuverability, or capability of driving the automobile in a straight line, and causes a rough and uncomfortable ride.

Figure 2:
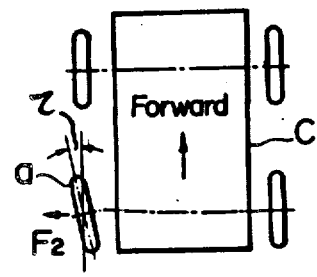

Referring to FIG. 2, if the suspension device is so constructed as to produce a steering angle (or toe angle) $\tau$, in response to the generation of the camber angle $\gamma$, upon encountering a bump $b'$ in the road $b$, and if the toe angle $\tau$ is so adjusted as to generate a cornering force $F_2$ having the same magnitude as that of the camber thrust force $F_1$ in the opposing direction, the aforesaid impediment against the straight maneuverability and a comfortable ride can be eliminated even when an automobile moves on a rough road.

The independent suspension device according to the present invention will now be described referring to FIGS. 3 to 5-D, illustrating, in partial views, an independent suspension device of semitrailing type. A wheel 1 is driven by an axle drive shaft 2, which is in turn driven by a differential gear means 3. The axle drive shaft 2 comprises two universal joints 2a, 2b and a splined connection covered by a boot 2c. A differential gear mounting member 4 carrying the differential gear means 3 is held by a mounting insulator 5. A suspension member 6 held by a suspension member holder 7 has brackets 11 to which the base portions 8a of a suspension arm means 8 is pivotally secured by bolts 10. A coil spring 9 for shock absorption engages the suspension arm means 8. The suspension arm means 8 has a bearing portion integrally formed at the free end 8b thereof, so as to axially support the wheel 1.

It is apparent to those skilled in the art that the coil spring 9 can be replaced by any other suitable shock-absorbing means, such as hydraulic shock absorbers.

Figure 3:
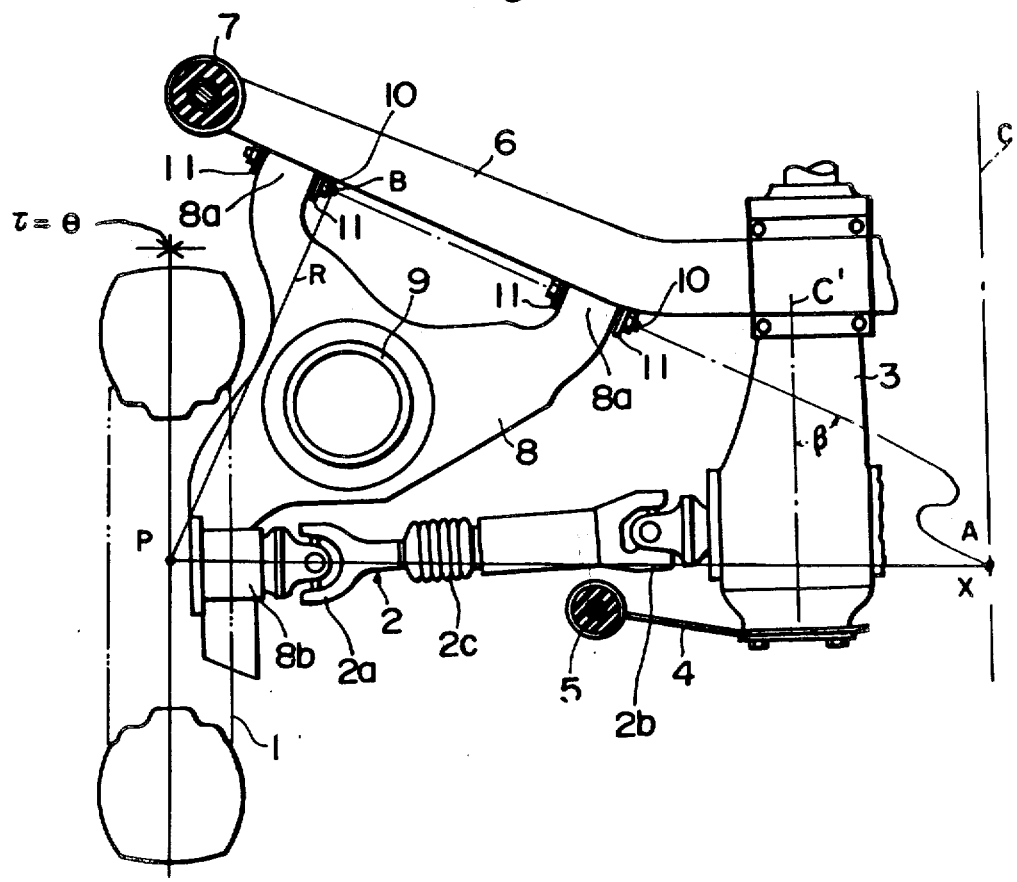
FIG. 3 is a partial schematic plan view of an independent suspension device of semitrailing arm type, according to the present invention.

FIGS. 5-A to 5-D are schematic views useful for analyzing the operation of the device depicted in FIGS. 3 and 4. FIG. 5-A is a schematic plan view, FIG. 5-B a side view, taken from the direction of the arrow M of FIG. 5-A, FIG. 5-C a side view taken from the direction of the arrow N of FIG. 5-B, and FIG. 5-D an elevation of FIG. 5-A. In the figures, a line $\overline{AB}$ represents the axis of rotation of the suspension arm means 8, a line $\overline{PX}$ the center line of the axle which is held horizontally, and a line C the longitudinal direction of the automobile. An angle $\alpha$ represents the angle of inclination of the axis $\overline{AB}$ relative to a horizontal plane of the vehicle, and another angle $\beta$ represents an angle defined by the longitudinal direction $C$ and the projection of the axis $\overline{AB}$ on the horizontal plane. If it is assumed that the points P and B are on a certain horizontal plane and that the points A and X are on a vertical line, as shown in FIG. 5-A, then the distance $\overline{AX}$ represents the height $h$ of the point A relative to the horizontal center line of axles. It is also assumed in the figures that $\angle ABP=90°$ and the length of the line $\overline{PB}$ is represented by $R$.

It is further assumed that the axle $\overline{PX}$ rotates with respect to the axis $\overline{AB}$ of rotation of the suspension arm means 8 by a small angle $\theta$, as shown in FIG. 5-C, so that the points P and X move to points P' and X', respectively. With such rotation of the axle $\overline{PX}$, a camber angle $\gamma$, as shown in FIG. 5-D, and a toe angle $\tau$, as shown in FIG. 5-A, are generated on the wheel 1 which is represented as a single line.

In FIG. 5-B, the distance $\overline{PP'}$ can be approximated by the length of an arc opposite to the chord $\overline{pp'}$. Accordingly, $\overline{PP'} = R\theta$ The point $P'$ lies on a plane inclined by an angle $\alpha$ with respect to a vertical axis $\overline{PD}$. If it is assumed that $\angle P'DP = 90°$, $\overline{PD} = R\theta \cos\alpha$ Since this distance $\overline{PD}$ is a height, as measured from the horizontal plane passing through the point B, it coincides with perpendicular $\overline{P'E}$ in FIG. 5 D, or $\overline{PD} = \overline{P'E}$ On the other hand, there is the following approximate relation with respect to the toe angle $\gamma$, because the angle $\gamma$ is very small.

$\sin\gamma = \overline{P'E}/\overline{P'X'}$     1

The length $\overline{P'X'}$ can be given by $\overline{P'X'} = \overline{PX} = \overline{PA} = R/(\cos\beta)$     2

Moreover, there is the following relation.

$\overline{P'E} = R\theta\cos\alpha$     3.

By substituting the equations (2) and (3) for the equation (1), $\gamma = R\theta\cos\alpha/(R/(\cos\beta)) = \theta\cos\alpha\cos\beta$     4

In FIG. 5-A, if perpendiculars from points $P'$ and $X'$ on the line $\overline{PX}$ intersect the line $\overline{PX}$ at points F and H, respectively, the toe angle $\tau$ satisfies the following relation.

$\tan\tau = (\overline{P'F} + \overline{X'H})/\overline{PA}$     5.

Here, $\overline{P'F} = \overline{DP'}\cos\beta$

Judging from FIG. 5-B, $\overline{DP'} = R\theta\sin\alpha$

Accordingly, $\overline{P'F} = R\theta\sin\alpha\cos\beta$     6.

In FIG. 5-A, $\overline{X'H} = \overline{AX'}\sin\beta$ $\overline{AX'} = \overline{XX'}$ In FIG. 5-C, $\overline{XX'} = h\theta$ In FIG. 5-B, $h = \overline{AB}\sin\alpha$ In FIG. 5-A, $\overline{AB} = R\tan\beta$ Accordingly, $h = R\tan\beta\sin\alpha$ Therefore, $\overline{X'H} = R\theta\tan\beta\sin\alpha\sin\beta = R\theta\sin\alpha\sin^2\beta/\cos\beta$     7.

From the aforesaid equation (2), $\overline{PA} = R/\cos\beta$     8.

By substituting the equations (6), (7), and (8) for the equation (5), $$\tau = \frac{R\theta \sin\alpha \cos\beta + R\theta \sin\alpha \sin^2\beta/\cos\beta}{R/\cos\beta}$$

$= \theta\sin\alpha(\cos^2\beta + \sin^2\beta)$ $= \theta\sin\alpha$

Henceforth, $\tau = \theta\sin\alpha$     9.

When the directions angles are determined as follows, $\gamma$ : Camber angle (to be positive when a force toward the center of vehicle is generated)

$\tau$ : Toe angle (ditto)

$\theta$ : Angular displacement of the suspension arm means around its axis of rotation (to be positive when the suspension arm means is rotated by bouncing)

$\alpha$ : Inclination of the axis of rotation of the suspension arm means with respect to a horizontal plane (to be positive when its wheel side end is higher than the differential gear side end, as measured from a horizontal plane passing the lowermost point of the wheel supported by the suspension arm means)

$\beta$ : Angle between the longitudinal direction of a vehicle and the projection of the axis of rotation of the suspension arm means on a horizontal plane (to be positive when the wheel side end of the projection is further away from the longitudinal center line of a vehicle than its differential gear side end)

Then, the variation of the camber angle $\gamma$ and the toe angle $\tau$ during the small amount of bounce and rebounce of the vehicle can be represented from the formulas (4) and (9) considering the direction of the angles.

$\gamma \doteq \theta\cos\alpha\cos\beta$     4'.

$\tau \doteq -\theta\sin\alpha$     9'.

In order to compensate the camber thrust with a cornering force caused by variable steering angle, the following equation should be satisfied.

$C\gamma + N\tau = 0$     10.

Here, $C$ : Camber thrust force per unit degree of camber angle (depending on the kind of tire used, loading conditions, etc.)

$N$ : Cornering force per unit degree of toe angle (depending on the kind of tire used, loading conditions, etc.)

By substituting the equations (4') and (9') for the equation (10), $(C\cos\alpha\cos\beta - N\sin\alpha)\theta = 0$ Therefore, $\cos\alpha\cos\beta/\sin\alpha = N/C$     11.

The value $N/C$ is known and determined by the type of vehicle and tire size.

In summary, if the angles $\alpha$ and $\beta$ are so selected as to satisfy the equation (11), the camber thrust and the cornering force generated by the variable camber and toe angle by bounce and rebounce of the wheel are compensated with each other, and accordingly, the straight maneuverability of vehicle can be ensured.

For instance, the value of the angle $\alpha$ was calculated for the case of $\beta = 65°$, and it proved that the most suitable value of the angle $\alpha$ is in the range of 2° to 4°, despite the fact that the suitable value of the angle $\alpha$ somewhat varies depending on the kind of tire used and loading conditions of the vehicle. The numerical values of the camber thrust $C$ and the cornering force $N$ are given by the following equations in the case of small passenger cars.

$C = F_1/\gamma = 5$ kg./degree $N = F_2/\tau = 30$ kg./degree

Here, $F_1$ : Total camber thrust force $F_2$ : Total cornering force

The use of the aforesaid numerical values of the camber thrust force $C$ and the cornering force $N$ gives an inclination angle of $\alpha = 3.5°$ for the axis of rotation of the suspension arm means.

FIG. 6 illustrates a typical example of the relation among the camber angle and the toe angle for different magnitudes of bounce.

FIG. 6, the ordinate shows bounce and rebounce of the wheel relative to the vehicle body shown as angle $\theta$, i.e. angular displacement of the suspension arm around its pivot axis, and the bounce angle is positive at the bounce side and negative at the rebounce side. The abscissa shows the camber angle $\gamma$ and the toe angle $\tau$, which can be positive and negative respectively. The curve $C$ shows camber angle $\gamma$ in relation to bounce angle $\theta$ and that the both angles are nearly proportional and the curve $C$ is nearly straight in the construction shown in FIGS. 3 and 4. The curve $S$ shows toe angle $\tau$ in relation to bounce angle $\theta$, the curve $S$ having maximum negative value at bounce side and increasing as the rebounce angle is increased. As shown by the solid line, when the bounce angle is $\theta$, the camber angle is $+\gamma$ and the toe angle is $-\tau$. Also as shown by the dotted line, when the rebounce is $-\theta$, the camber angle is $-\gamma$ and the toe angle is $+\tau$. When the relation between the angles $\alpha$ and $\beta$ satisfies the above-mentioned formulas (11), the camber thrust and the cornering force produced by the angles $\gamma$ and $\tau$ is compensated completely or approximately, thus desired straight maneuverability of the vehicle is attained.

As described in the foregoing, according to the present invention, there is provided an independent suspension device for automobiles, which includes a suspension arm means whose axis of rotation is slanted relative to the longitudinal axis of the automobile on a horizontal plane by a first angle, and the axis of rotation of the suspension arm means is also inclined with respect to a horizontal plane by a second angle, said first angle being so related with said second angle that the camber thrust force generated in the automobile body by the motion of the wheel relative to the automobile body is always cancelled by the concerning force generated therein by said motion of said wheel, regardless of the magnitude of the bouncing movement of the wheel, whereby, the straight maneuverability and the ride of the automobile is greatly improved even during driving on rough roads.

What we claim is:

1. An independent wheel suspension arrangement for cancelling the camber thrust force generated in an automobile body having drive means and a drive axle shaft by the motion of said wheel relative to said automobile body by the cornering force generated by said motion of said wheel to improve the straight maneuverability and ride of a vehicle having a predetermined N/C value, where N is a cornering force per unit degree of toe angle generated in said vehicle body by angular displacement of said wheel in a horizontal plane relative to said body and C is a camber thrust force per unit degree of camber angle generated in said body by angular displacement of said wheel in a vertical plane relative to said body, comprising a suspension member connected to said vehicle, suspension arm means, swingably attaching one end of said suspension arm means to said suspension member about an axis of rotation, said axis of rotation being directed downwardly and rearwardly and inwardly toward the vehicle, a wheel stub axle secured to said wheel, bearing means integrally connected to said suspension arm means for rotatably supporting said stub axle, a first universal joint means operatively connected between one end of said axle shaft and said stub axle, a second universal joint means connected to the other end of said axle shaft and said drive means for transmitting driving power to said axle shaft and stub axle and shock-absorbing suspension means positioned between said suspension arm means and said body, said suspension arm means causing a camber thrust force to be generated towards and perpendicular to the longitudinal axis of said vehicle and a cornering force to be generated in a direction opposite said camber thrust force during movement of said suspension arm means about said axis of rotation during operation of said vehicle, said axis of rotation of said suspension arm means projected on a horizontal plane and forming a first angle $\beta$ relative to a horizontal line parallel to the longitudinal axis of the vehicle body and inclined vertically with respect to said horizontal plane at a second angle $\alpha$, said suspension arm means being positioned to provide said first and second angles satisfying the relation of $\cos\alpha\cos\beta/\sin\alpha = N/c$, the N/C value being predetermined for a given vehicle to cause the cornering force and camber thrust force produced by the movement of said suspension arm means about said axis of rotation to substantially compensate for each other.